United States Patent [19]
Johnson, III et al.

[11] Patent Number: 4,697,675
[45] Date of Patent: Oct. 6, 1987

[54] SHAFT ALIGNED BACKSTOP FOR A REDUCER

[75] Inventors: Harold R. Johnson, III, Aberdeen, Ohio; Allyn E. Phillips, Maysville, Ky.; Erwin R. Carrigan, Manchester, Ohio; Richard A. Virgo, Trumansburg; James E. Mickelson, Newfield, both of N.Y.

[73] Assignee: Emerson Electric Co., St. Louis, Mo.

[21] Appl. No.: 869,794

[22] Filed: Jun. 2, 1986

[51] Int. Cl.⁴ ............... F16D 59/00; F16H 57/10
[52] U.S. Cl. .................... 192/7; 74/411.5; 188/82.8
[58] Field of Search ........... 192/8 R, 7, 41 A, 45.1; 188/82.8, 82.84; 74/411.5; 384/192, 438

[56] References Cited

U.S. PATENT DOCUMENTS

| | | | |
|---|---|---|---|
| 2,603,322 | 7/1952 | Dunn | 188/82.8 X |
| 2,765,053 | 10/1956 | Schmitter | 188/82.8 |
| 2,834,445 | 5/1958 | Gorsky | 192/45.1 |
| 2,969,222 | 1/1961 | Sears | 192/8 R X |
| 3,240,300 | 3/1966 | McKay | 192/8 R |
| 3,243,023 | 3/1966 | Boyden | 192/8 R |
| 3,693,770 | 9/1972 | Charchian et al. | 192/8 R X |
| 3,734,254 | 5/1973 | Yanikoshi | 192/8 R X |
| 3,997,041 | 12/1976 | Judd et al. | 192/41 A |
| 4,177,887 | 12/1979 | Kellett et al. | 192/8 R |
| 4,327,822 | 5/1982 | Vogele et al. | 192/41 A |
| 4,360,093 | 11/1982 | Wakabayashi et al. | 192/41 A |

FOREIGN PATENT DOCUMENTS

| | | | |
|---|---|---|---|
| 1053327 | 3/1959 | Fed. Rep. of Germany | 188/82.84 |
| 2562483 | 10/1985 | France | 192/7 |
| 781973 | 8/1957 | United Kingdom | 188/82.84 |
| 781023 | 8/1957 | United Kingdom | 45.1/ |

Primary Examiner—Rodney H. Bonck
Attorney, Agent, or Firm—Charles E. Markham

[57] ABSTRACT

A backstop for a reducer having a casing comprises a one-way cylindrical clutch having a plurality of circularly arranged locking elements therein engaged by the periphery a reducer input shaft passing axially therethrough. To achieve a precise concentricity of the reducer shaft and the circularly arranged locking elements so that each element is stressed, the clutch is loosely housed in and loosely keyed to a clutch casing which is in turn firmly attached to a portion of the reducer casing and the one-way clutch and circularly arranged locking elements are then bushing aligned concentric with the reducer input shaft extending axially therethrough.

4 Claims, 8 Drawing Figures

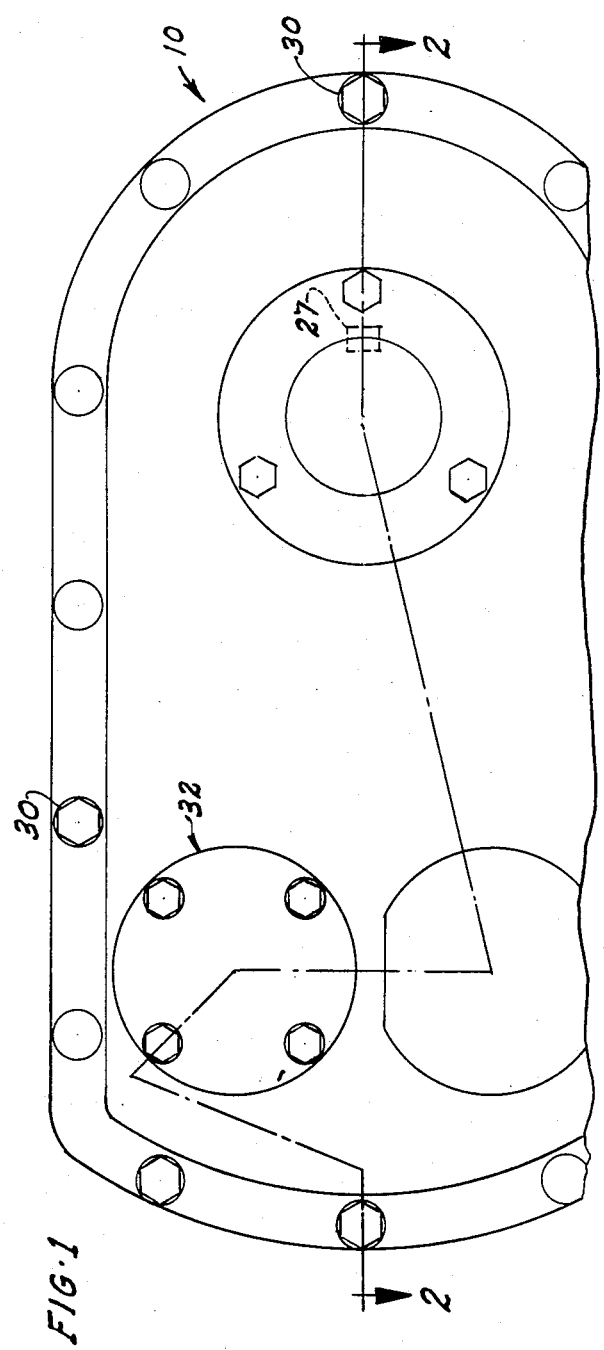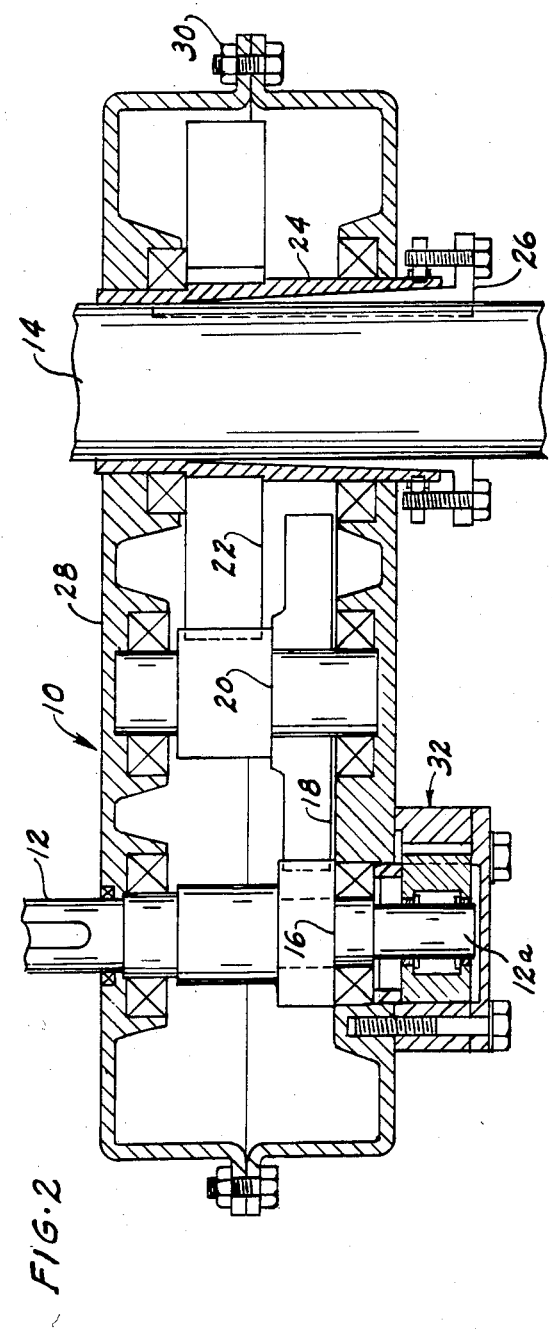

SHAFT ALIGNED BACKSTOP FOR A REDUCER

This invention relates to backstops for reducers to preclude a reversal in direction of the reducer which may be caused by the load driven by the reducer. It particularly concerns a backstop comprising a one-way clutch having a plurality of circularly arranged locking elements which require a precise concentricity with the driving or driven reducer shaft, which engages them, for each locking element to share a reversal force and jointly preclude a reversal in direction.

BACKGROUND OF THE INVENTION

Heretofore, the backstop comprising a cylindrical one-way clutch was entered and fixed at one end in an opening in the reducer casing with an extension of the reducer input shaft extending axially through the center of the clutch and engaging a plurality of circularly arranged locking elements therein. In this prior arrangement, wherein the one-way clutch is provided with a plurality of circularly arranged locking elements, was the problem of achieving and maintaining the degree of concentricity required between the circularly arranged locking elements and the extension of the reducer shaft, which engaged the locking elements, to result in each of the circularly arranged locking elements being stressed by a reversal force so as to jointly preclude a reversal of the reducer. Establishing and maintaining this degree of concentricity was both difficult and costly and in the prior arrangement frequently just one or a part of the plurality of the circularly arranged locking elements absorbed all of the reversal force resulting in a malfunctioning backstop.

SUMMARY OF THE INVENTION

A relatively structurally strong, hollow cylindrical, clutch casing is provided and attached to a reinforced portion of a reducer casing by cap screws which are in shear when the clutch casing is stressed by a reversal force. The one-way clutch has a body which is of cylindrical shape and has a loose fit, both axially and radially in the hollow cylindrical clutch casing but is keyed to the clutch casing at its periphery by a free fitting key so that the cylindrical one-way clutch has a limited free movement both axially and radially in the cylindrical clutch casing.

Additionally, the one-way clutch has a plurality of circularly arranged locking elements therein and an extension of the reducer input shaft passes axially through the center of the clutch and engages the circularly arranged locking elements.

To establish and maintain the degree of concentricity between the circularly arranged locking elements in the one-way clutch and the reducer shaft extension required to assure that each of the circularly arranged locking elements is stressed by a reversal force to thereby jointly effect a backstop, the loosely fitting one-way clutch is bushing aligned with the reducer shaft extension to effect this degree of concentricity.

OBJECTS OF THE INVENTION

It is the primary object of this invention to provide a new, improved and more reliable backstop for a reducer.

A further object is to provide a backstop for a reducer comprising a one-way clutch having a plurality of circularly arranged locking elements therein and in which the concentricity of a reducer shaft axially passing therethrough and engaging the locking elements is such that all locking elements share in a reversal stress to preclude a reversal of the reducer.

More specifically the reducer shaft is bushing aligned with the center of a plurality of circularly arranged locking elements which are encased in the one-way clutch and the one-way clutch is loosely retained in a clutch casing and loosely keyed thereto which clutch casing is in turn fixed to the reducer casing.

These and other objects will appear when reading the following description of a preferred form of the invention in connection with the accompanying drawings.

In the Drawings

FIG. 1 is a part elevational view of a reducer having a backstop thereon constructed in accordance with the present invention;

FIG. 2 is a cross-sectional view taken along line 2—2 of FIG. 1;

DESCRIPTION OF A PREFERRED FORM OF THE INVENTION

Figure 8:
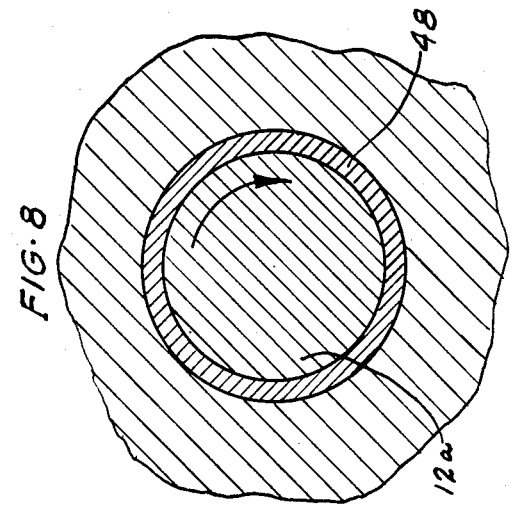
FIG. 8 is a cross-sectional view taken along line 8—8 of FIG. 6.

FIGS. 1 and 2 show a motion reducer generally indicated at 10 having an input shaft 12, an output shaft 14 and intermediate gears 16, 18, 20 and 22 for reducing motion, with suitable supporting shafts and bearings. The sleeve 24 keyed to the gear 22 includes a key 27 forming a driving connection with the output shaft 14. Also there is shown a split bushing 26 for aligning the output shaft 14 with the sleeve 24. The two section casing 28 for the reducer is joined by bolts 30.

The reducer 10 is provided with a backstop, generally indicated at 32 in FIG. 2 for the purpose of precluding any reversal in direction of the reducer or the load driven thereby. For example; when the output shaft 14 of the reducer drives an inclined conveyor for the transportation of coal or rock to an elevated position and the input power fails, a backstop precluding a reversal of the reducer and conveyor will avoid a pile up of coal or rock at the lower end of the conveyor.

The backstop generally indicated at 32 in FIGS. 1 and 2 is essentially a one-way clutch 34 loosely housed in a hollow cylindrical casing 40, see enlarged FIGS. 4 to 8. The one-way clutch 34 has a cylindrical body within which a plurality of circularly arranged locking elements 36 are concentrically disposed. The locking elements are engaged by the periphery of an extension of the reducer input shaft 12a which passes axially through the center of the cylindrical clutch thereby to prevent rotation of the shaft extension 12a and the reducer in an opposite direction to that which it is normally driven as by an electric motor.

Figure 6:
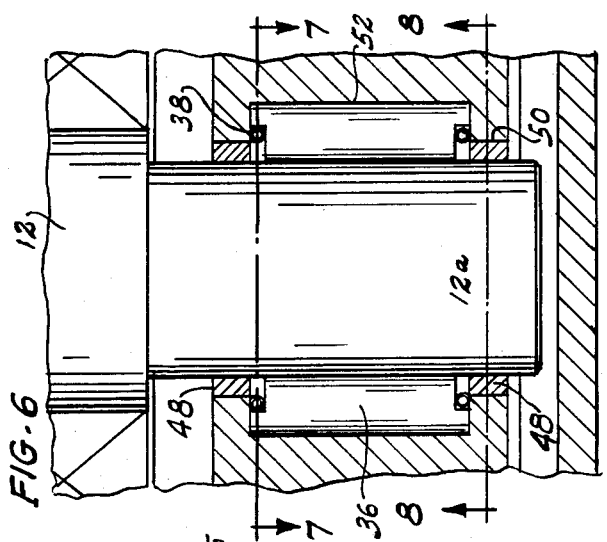
FIG. 6 is a further enlarged partial cross-sectional view taken along line 4—4 of FIG. 3.
Figure 7:
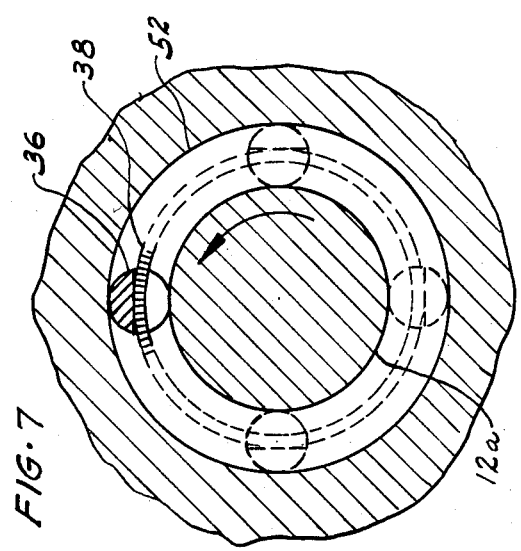
FIG. 7 is a cross-sectional view taken along line 7—7 of FIG. 6.
Figure 3:
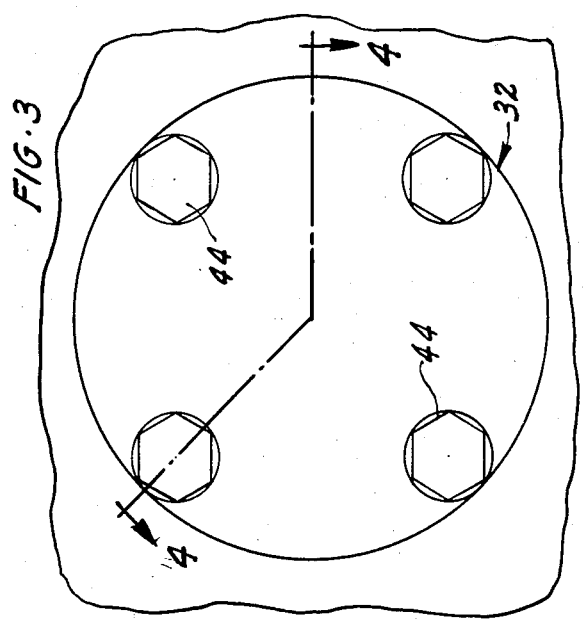
FIG. 3 is an enlarged elevational view of the backstop shown in FIG. 1.
Figure 4:
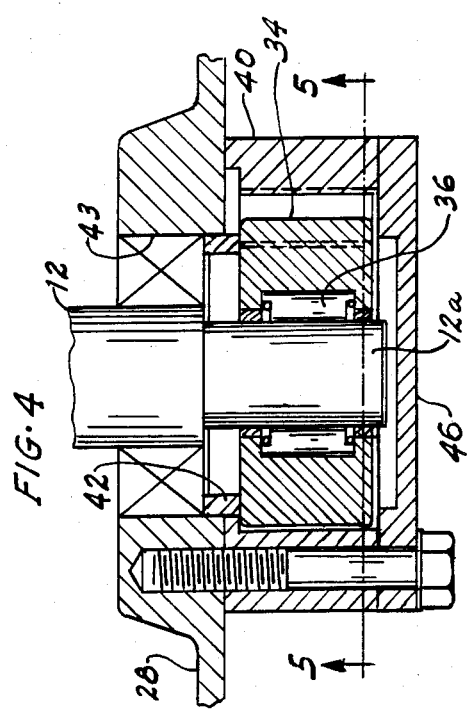
FIG. 4 is a cross-sectional view taken along line 4—4 of FIG. 3.

In FIGS. 6 and 7 we have shown, as locking elements 36, a plurality of circularly arranged bars 36 which are slightly oval in cross section and are held in retention and in a non-locking position in an intermediate undercut bore 52 by endless garter springs 38. It will be understood that the number of circularly arranged locking elements 36 may vary.

The clutch casing 40 is hollow and cylindrical and is attached to the reducer casing 28 by four cap screws 44. An annular spacing ring 42 is fitted into a bearing opening 43 to space the loosely fitted one-way clutch 34 axially in the casing 40, see FIG. 4. The clutch casing 40 has a detachable cover 46 which permits inspection or removal and replacement of the clutch 34.

To establish and maintain the degree of concentricity of the input shaft extension 12a with the center of the plurality of circularly arranged locking elements 36 so as to assure a uniform contact therewith resulting in each of the locking elements sharing in a reversing stress so as to jointly preclude a reversal of the reducer, the shaft extension 12a is bushing aligned with the center of the circularly arranged bars 36.

Figure 5:
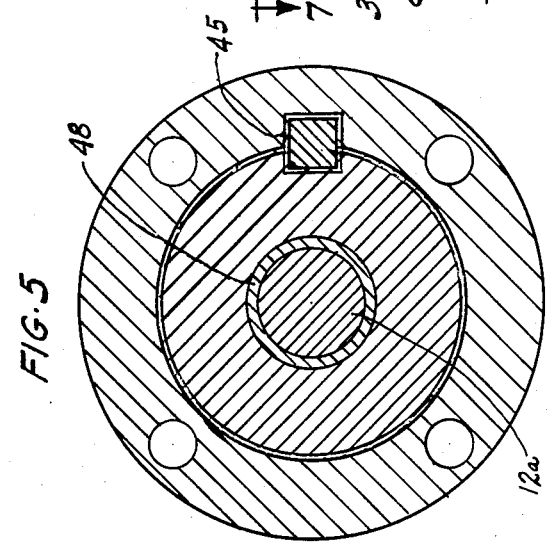
FIG. 5 is a cross-sectional view taken along line 5—5 of FIG. 4.

To accomplish this degree of concentricity the body of the cylindrical one-way clutch 34 is loosely fitted both axially and radially in the hollow cylindrical casing 40 but is loosely keyed at its periphery to the casing 40 by a loosely fitting key 45, see FIG. 5. The shaft extension 12a is extended axially through the center of the one-way clutch and freely aligned concentric with the center of the circularly arranged locking elements 36 and by the insertion of annular aligning bushings 48 which are fitted into annular spaces 50 at each end of the clutch maintain this concentricity. The annular spaces 50 are formed by an axial bore in the clutch 34 and the shaft extension 12a. It will be understood that the locking elements 36 are of uniform dimensions and shape so that they may be aligned concentric with the input shaft extension 12a.

Operation of the Backstop

An arrow in FIG. 7 of the drawings indicates which direction of rotation the input shaft extension 12a normally rotates when driving a load. So long as the rotation is in this direction the shaft 12a will not engage the locking elements 36. A reverse rotational movement of the input shaft extension 12a however which may be caused by the load will rotate the slightly oval locking bars 36 to a locking position in which the diameter of the oval locking elements 36 is slightly greater than the annular space formed by the shaft extension 12a and the undercut bore 52. Increasing the reversal force will increase the locking of input shaft 12a. Suitable means for anchoring the reducer casing 28 (not shown) is provided. While in the preferred form of the invention the one-way clutch 34 is mounted on an extension of the input shaft 12a of the reducer it will be understood that the one-way clutch 34 may be mounted on any shaft or shaft extendion of the reducer 10.

We have, in the foregoing fully described the manner of achieving and maintaining the degree of concentricity required between the plurality of circularly arranged locking elements 36 and the shaft extension 12a of the reducer input shaft which will result in each of the plurality of circularly arranged locking elements sharing a reversing stress so as to jointly preclude a reversal of the reducer.

We claim:

1. A backstop for a reducer having a casing, comprising a cylindrical, one-way clutch having a plurality of circularly arranged locking elements therein centered on its axis, a casing for said clutch fixed to said reducer casing, said clutch being loosely fitted in said clutch casing but being loosely keyed thereto so that said clutch has a limited free movement in said clutch casing both axially and radially, an axial bore through said clutch centrally of said circularly arranged locking elements, a reducer shaft extending through said bore and engaging said locking elements, and means for aligning and fixing said reducer shaft for rotation in said bore concentric with said circularly arranged locking elements.

2. A backstop for a reducer as claimed in claim 1 in which the degree of concentricity between said reducer shaft and the center of said circularly arranged locking elements is that which causes all of said plurality of circularly arranged locking elements to be substantially stressed when reversal stress exists.

3. A backstop for a reducer as claimed in claim 1 in which said bore extending axially through said clutch is larger in diameter than said reducer shaft and said means for establishing and maintaining concentricity between said reducer shaft and said circularly arranged locking elements are annular bushings pressed into said bore and fitted to said shaft for rotation therein at each end of said clutch.

4. A backstop for a reducer having a casing, comprising a one-way cylindrical clutch having a plurality of circularly arranged locking elements centered on the axis thereof, a hollow cylindrical casing for said clutch, means fixing said clutch casing to said reducer casing, said clutch being loosely fitted in said clutch casing but being loosely keyed thereto so that said clutch has a limited free movement axially and radially in said clutch casing, a bore extending axially through said clutch and centrally of said circularly arranged locking elements, a reducer shaft extension extending through said bore and engaging at its periphery said locking elements, and an annular bushing pressed into said bore and fitted on said reducer shaft at each end of said clutch for establishing and maintaining concentricity between said reducer shaft and said circularly arranged locking elements.

* * * * *